US012672618B2

(12) United States Patent
Deslippe et al.

(10) Patent No.: US 12,672,618 B2
(45) Date of Patent: Jul. 7, 2026

(54) SYSTEM FOR ROTATING HORTICULTURE TOWERS

(71) Applicant: 11778757 CANADA INC., Montreal (CA)

(72) Inventors: Brady Deslippe, Longueuil (CA); Tristan Zeman, Montreal (CA); Jonathan Lawson, Oakville (CA)

(73) Assignee: 11778757 CANADA INC., Montreal (CA)

( * ) Notice: Subject to any disclaimer, the term of this patent is extended or adjusted under 35 U.S.C. 154(b) by 357 days.

(21) Appl. No.: 18/273,120

(22) PCT Filed: Mar. 10, 2022

(86) PCT No.: PCT/CA2022/050348
§ 371 (c)(1),
(2) Date: Jul. 19, 2023

(87) PCT Pub. No.: WO2022/187958
PCT Pub. Date: Sep. 15, 2022

(65) Prior Publication Data
US 2024/0090393 A1      Mar. 21, 2024

Related U.S. Application Data

(60) Provisional application No. 63/159,160, filed on Mar. 10, 2021.

(51) Int. Cl.
*A01G 31/04*      (2006.01)
*A01G 9/26*      (2006.01)

(52) U.S. Cl.
CPC ............. *A01G 31/045* (2013.01); *A01G 9/26* (2013.01)

(58) Field of Classification Search
CPC .... A01G 31/04; A01G 31/045; A01G 31/047; A01G 31/008; A01G 31/011
See application file for complete search history.

(56) References Cited

U.S. PATENT DOCUMENTS 3,909,978 A * 10/1975 Fleming ............... A01G 31/042
                                                                    47/17
5,617,673 A      4/1997 Takashima
7,730,663 B2      6/2010 Souvlos et al.
2014/0000162 A1      1/2014 Blank
2014/0165468 A1      6/2014 Roeser et al.
(Continued)

FOREIGN PATENT DOCUMENTS

CN      107079801 A      8/2017
CN      207783896 U      8/2018
(Continued)

OTHER PUBLICATIONS

International Search Report dated Jun. 15, 2022, for PCT/CA2022/050348 filed on Mar. 10, 2022, 11 pages.

*Primary Examiner* — Katelyn T Truong

(57) ABSTRACT

The present disclosure relates to a system for rotating at least one horticulture tower. The system comprises at least one horticulture tower and an apparatus for rotating the at least one horticulture tower. The at least one horticulture tower is decoupled from the apparatus for rotating the at least one horticulture tower, such that the at least horticulture tower may be independently conveyed about a facility.

18 Claims, 8 Drawing Sheets

(56)     References Cited

U.S. PATENT DOCUMENTS

| | | | |
|---|---|---|---|
| 2014/0283450 A1 | 9/2014 | Darlington | |
| 2018/0042186 A1 | 2/2018 | Kop | |
| 2019/0183076 A1* | 6/2019 | Muramoto | A01G 31/042 |
| 2021/0243963 A1* | 8/2021 | van Staalduinen | A01G 9/143 |
| 2022/0338422 A1* | 10/2022 | Asperger | G05B 15/02 |
| 2024/0049651 A1* | 2/2024 | Lee | A01G 9/0299 |
| 2024/0349669 A1* | 10/2024 | Massey | A01G 31/06 |
| 2025/0048981 A1* | 2/2025 | Tang | A01G 31/06 |

FOREIGN PATENT DOCUMENTS

| | | | |
|---|---|---|---|
| CN | 110521435 A | 12/2019 | |
| CN | 211931886 U | 11/2020 | |
| GB | 1105049 A | 3/1968 | |
| GB | 2431328 A | 4/2007 | |
| KR | 102001464 B1 | 7/2019 | |
| WO | 2020041242 A1 | 2/2020 | |
| WO | 2020154767 A1 | 8/2020 | |

* cited by examiner

1

SYSTEM FOR ROTATING HORTICULTURE TOWERS

CROSS REFERENCE TO PRIOR APPLICATIONS

This application claims priority to U.S. provisional patent application No. 63/159,160 filed Mar. 10, 2021 and entitled "SYSTEM FOR ROTATING HORTICULTURE TOWERS", the contents of which is incorporated herein by reference in its entirety.

FIELD

This present disclosure relates generally to agriculture of crops in a controlled environment, and specifically to systems enabling the efficient growth of crops in a controlled environment.

BACKGROUND

Communities in seasonal climates have long had to import produce during months in which local farmers are unable to meet local demand. In North America, all of Canada and many northern U.S. states import vast quantities of fresh produce from the American southwest and Mexico, placing added pressure on already fragile water systems. Vertical farming offers a solution by enabling year-round crop growth within an indoor, climate-controlled environment. This process uses 90-95% less water than field-grown crops, with spatial efficiency up to 12-times better than greenhouse operations. Despite these advantages, vertical farming has yet to substantially offset dependence on imported crops during the winter months. A significant barrier to widespread adoption is the high production cost due to the vast energy requirements of artificial lighting and constant climate control. Costs are further driven upward by the vast capital expenditures required to build climate-controlled vertical farms, a large portion of which are made up of the cost of LED light fixtures. While LED light fixtures have become substantially more efficient and less expensive in recent years, the purchase of these fixtures still stands as the costliest component when building a vertical farm.

While most vertical farms are made up of horizontal beds which are stacked multiple tiers high, vertical farms can also be made up of vertical towers from which crops grow outwards and roots extend inwards towards an irrigation source. The roots can be directly irrigated, while the crops grow on the outside of the tower. Many vertical towers used in the industry enable growth on a single face of a tower, which faces a light source. By rotating a multi-sided vertical tower in front of a centralized light source, it is possible to expose multiple columns of crops to the same light source and reduce the overall lighting requirement while maintaining the overall output of a vertical farm. In doing so, vertical farms can reduce energy costs, along with capital cost associated with LED lights when building a vertical farm.

There are some examples in the industry of rotating vertical towers with crops growing on multiple faces, however, these systems have not been adopted at a commercial scale to this point. Current rotating vertical towers must be irrigated with a nutrient-enriched solution from the top of the tower, down through the inside of the tower. The rotation allows roots along the inside of the tower to be provided with nutrient-rich water from a single irrigation source. One major issue with the current methods of rotating horticulture towers is the inability for the rotating towers to be moved about a facility, since these methods require the horticulture towers to be coupled with the mechanism used to rotate the horticulture towers. Best practices in the industry would dictate that a growing space be kept as clean and sanitary as possible. There are many processes that occur before, during and after the growing phase, including transplanting, harvesting, tower cleaning and more. Harvesting and planting of towers naturally involves disturbing the crops on the towers, which can enable the spread of disease or pest if present. Cleaning of towers using soap and sanitation solutions must also be done away from other towers with live, edible crops to avoid harming or contaminating the crops. It is not practical, nor is it sanitary to harvest or plant towers in the middle of a grow chamber.

Therefore, the ability to easily move towers about a facility, and to and from the various processing stations (harvest, planting, cleaning) is the key to operational efficiency of the rotating tower method at commercial scale. However, the examples of rotating towers that exist do not allow for this freedom of motion. This is because within the existing art, the mechanism used to rotate the towers is fixed in place, and attached directly to the tower. Because the rotational mechanism is fixed in place, and attached to the tower, movement of the tower along with the affixed mechanism is often impossible, or at best, complex to the point of not being practicable.

Based on the foregoing, there is a need in the art for a system that decouples a horticulture tower itself from the mechanism that rotates it, allowing the tower to be kept as a neutral object which is free to be manipulated, either by rotation in place or conveyance to and from processing stations in a vertical farm.

SUMMARY OF INVENTION

The needs remaining in the prior art are addressed by the present disclosure, which relates to an improved system for rotating at least one horticulture tower, which decouples the tower(s) itself from the mechanism that rotates it. The system of the present disclosure keeps the tower as a neutral object which is free to be manipulated, either by rotation in place or conveyance to and from processing stations in a vertical farm. The tower may be rotated in place so that the tower has constant access to fixed light, irrigation and ventilation sources; or the tower may be conveyed to a processing station, without any additional step of decoupling the tower from its rotating mechanism. The system of the present disclosure may allow for vast improvements in energy efficiency for vertical farms. However, the key to unlocking the rotating tower method at a commercial scale lies in the ability to decouple rotation from the tower itself, and thereby free the tower to be conveyed at any time an operator deems necessary to any place accessible via a centralized conveyance system. The decoupling may also allow the horticulture towers to be repositioned, for example to adjust the spacing between various horticulture towers.

In some embodiments, the present disclosure relates to a system for rotating at least one horticulture tower, the system comprising at least one horticulture tower and an apparatus for rotating the at least one horticulture tower. The at least one horticulture tower in this system is decoupled from the apparatus for rotating the at least one horticulture tower. In some embodiments, the at least one horticulture tower is decoupled from the rotational apparatus such that it may be independently conveyed about a facility.

In some embodiments, the horticulture tower(s) may be suspended or supported by a conveyor system.

In some embodiments, the system may comprise a plurality of apparatuses for rotating a horticulture tower. In some embodiments, the system may comprise a plurality of horticulture towers.

In some embodiments, the system may further comprise a light source, an irrigation source, a ventilation source or a combination thereof.

In some embodiments, the apparatus for rotating at least one horticulture tower may comprise at least one drive motor, the at least one drive motor operatively connected to at least one power supply. The apparatus may comprise at least one drive assembly for imparting drive from the at least one drive motor to at least one wheel assembly, the at least one drive assembly being operatively connected to an output shaft of the at least one drive motor and an axle of the at least one wheel assembly, the at least one wheel assembly having at least one tower engagement wheel coupled to the axle for rotation therewith, the at least one tower engagement wheel having an outer surface for frictional engagement with the at least one horticulture tower. The apparatus may comprise an attachment assembly for coupling the at least one drive motor, the at least one drive assembly and the at least one wheel assembly to a support structure. The at least one tower engagement wheel when driven by the at least one drive motor and frictionally engaged to said at least one horticulture tower causes the at least one horticulture tower to rotate. The apparatus is decoupled from the at least one horticulture tower.

In some embodiments, the apparatus comprises one drive motor and a plurality of wheel assemblies.

In some embodiments, the support structure of the apparatus comprises: a first arm having a first end and a second end; a second arm having a first end and a second end, the second arm being rotatably connected to the second end of the first arm; and a biasing mechanism moveably connecting the second arm to a fixed point, the biasing mechanism configured to bias the second end of the second arm toward the first arm; wherein the at least one wheel assembly is connected to the first end of the second arm. In some embodiments, the fixed point is the first arm.

In some embodiments, the biasing mechanism moveably connects the second end of the second arm to the fixed point, thereby pulling the second end of the second arm towards the fixed point.

In some embodiments, the biasing mechanism moveably connects the first end of the second arm to the fixed point, thereby pushing the first end of the second arm away from the fixed point.

In some embodiments, the biasing mechanism comprises at least one spring.

In some embodiments, the apparatus further comprises a third arm having a first end and a second end, the first end of the third arm being connected to the first arm. The biasing mechanism moveably connects the second end of the second arm to the third arm, the biasing mechanism configured to bias the second end of the second arm toward the third arm.

In some embodiments, the apparatus further comprises a third arm having a first end and a second end, the first end of the third arm being connected to the first arm. The biasing mechanism moveably connects the first end of the second arm to the third arm, the biasing mechanism configured to bias the first end of the second arm away from the third arm.

In some embodiments, the outer surface of the at least one tower engagement wheel comprises rubber. In some embodiments, the outer surface of the at least one tower engagement wheel comprises a sprocket or a plurality of protruding members.

In some embodiments, the apparatus comprises a plurality of drive assemblies and a plurality of wheel assemblies; and the at least one drive assembly is coupled to the axles of two of the wheel assemblies.

In some embodiments, the apparatus further comprises at least one biasing mechanism, each biasing mechanism moveably connecting the support structure to a fixed point, the at least one biasing mechanism configured to bias the support structure towards the at least one horticulture tower.

In some embodiments, the at least one biasing mechanism comprises a hinge having a first hinge portion connected to the fixed point; and a second hinge portion connected to the support structure and pivotally coupled to the first hinge portion; a pneumatic actuator operatively connected to the first and second hinge portions. Upon being actuated, the pneumatic actuator exerts a force on the second hinge portion urging the support structure towards the at least one horticulture tower.

Other and further aspects, features and embodiments of the present disclosure will become apparent during the course of the following discussion and by reference to the accompanying drawings.

BRIEF DESCRIPTIONS OF THE DRAWINGS

For a better understanding of the various implementations described herein and to show more clearly how they may be carried into effect, reference will now be made, by way of example only, to the accompanying drawings in which.

DETAILED DESCRIPTION

The description which follows, and the embodiments described therein, are provided by way of illustration of an example, or examples, of particular embodiments of the principles of the present disclosure. These examples are provided for the purposes of explanation, and not limitation, of those principles and of the disclosure.

The present disclosure relates to the rotation of horticulture towers. For the purpose of this disclosure, "horticulture tower" is defined as any arrangement of one or more plants or crops, suspended or supported vertically. The "horticulture tower" may include but is not limited to the following: a series of interconnected growing slots arranged on one or multiple sides of a growing column, in any configuration, which allows for irrigation of the plants in the growing slots. The horticulture tower may be a vertical hydroponic and/or aeroponic horticulture tower. A horticulture tower may be used for growing any plant or crop including but not limited to trees, shrubs, *cannabis*, food crops, vine crops, and any other plant or crop which may be grown in a controlled environment.

In an embodiment, the system of the present disclosure includes an apparatus that rotates a horticulture tower about its vertical axis. In some aspects, the apparatus rotates a vertical hydroponic and/or aeroponic horticulture tower about its vertical axis such that crops growing on all sides of the outside of the tower may be uniformly exposed to light, airflow and irrigation while also allowing the towers to move or be moved about a farm on some form of conveyance system. In some aspects, the apparatus for rotating the horticulture tower may be completely decoupled from the vertical horticulture tower, such that it contacts the horticulture tower only while in the horticulture tower is in its growing position, so that the tower may move freely about a farm for processes including harvesting, transplanting, cleaning and monitoring. In some aspects, the apparatus is able to rotate the horticulture tower on its vertical axis while the horticulture tower remains in place.

Enabling axial rotation of a horticulture tower with an apparatus that is entirely decoupled from the tower itself, allows for free movement of the tower about a facility, while also enabling the highly efficient process of rotating towers in place to expose crops on all sides of a tower to uniform light, airflow and nutrient solution. Decoupling the apparatus for rotating the horticulture tower from the horticulture tower itself reduces the complexity of the horticulture tower's configuration since the tower itself is free of unnecessary mechanical parts.

In some embodiments, the system of the present disclosure may comprise multiple apparatuses. In some embodiments, the multiple apparatuses may be configured to allow a plurality of adjacent horticulture towers to rotate in opposite directions, which may reduce collisions between crops on adjacent horticulture towers.

Figure 1:
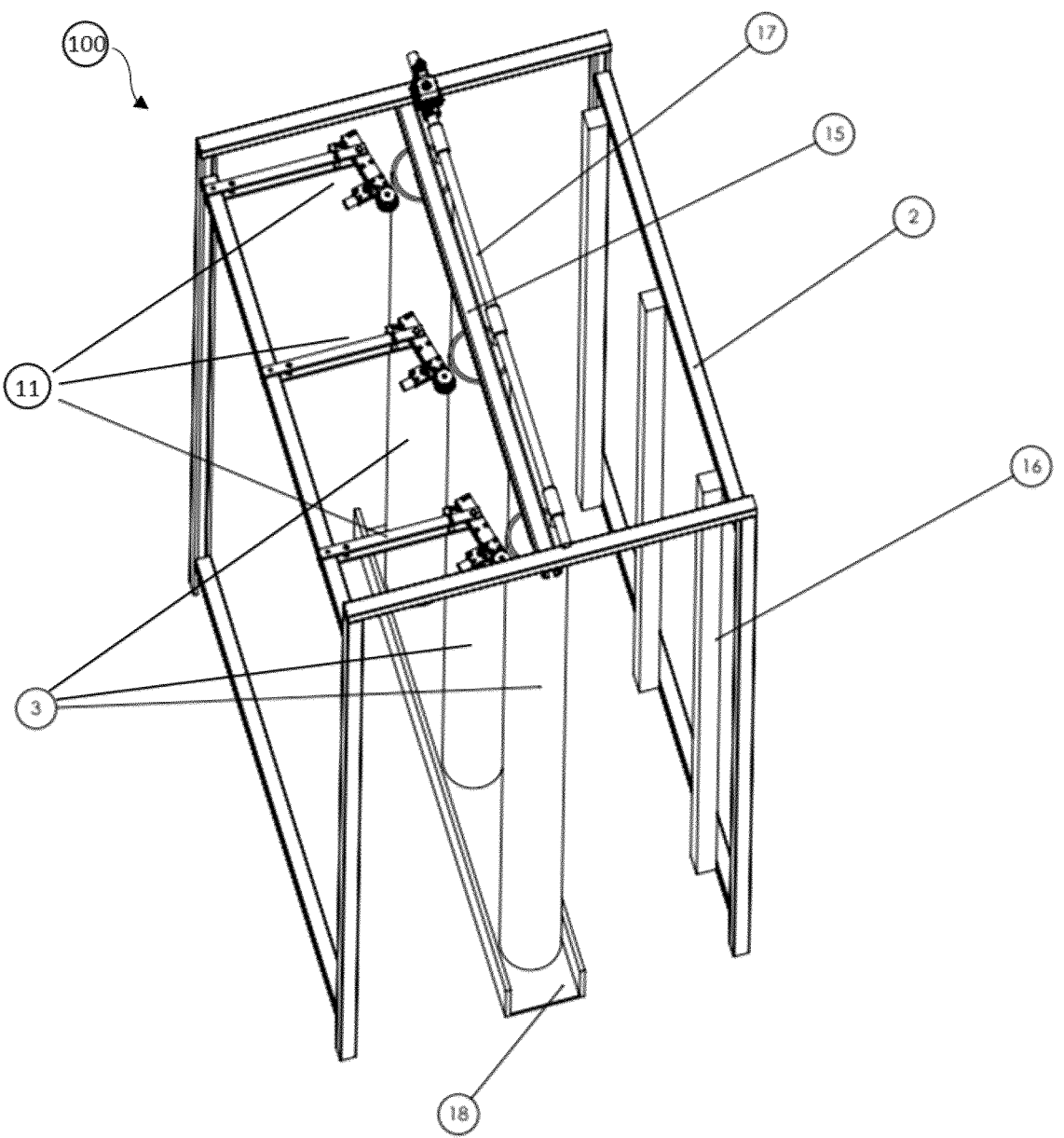
FIG. 1 depicts a perspective view of a system for rotating multiple horticulture towers according to a non-limiting embodiment of the present disclosure.
Figure 2:
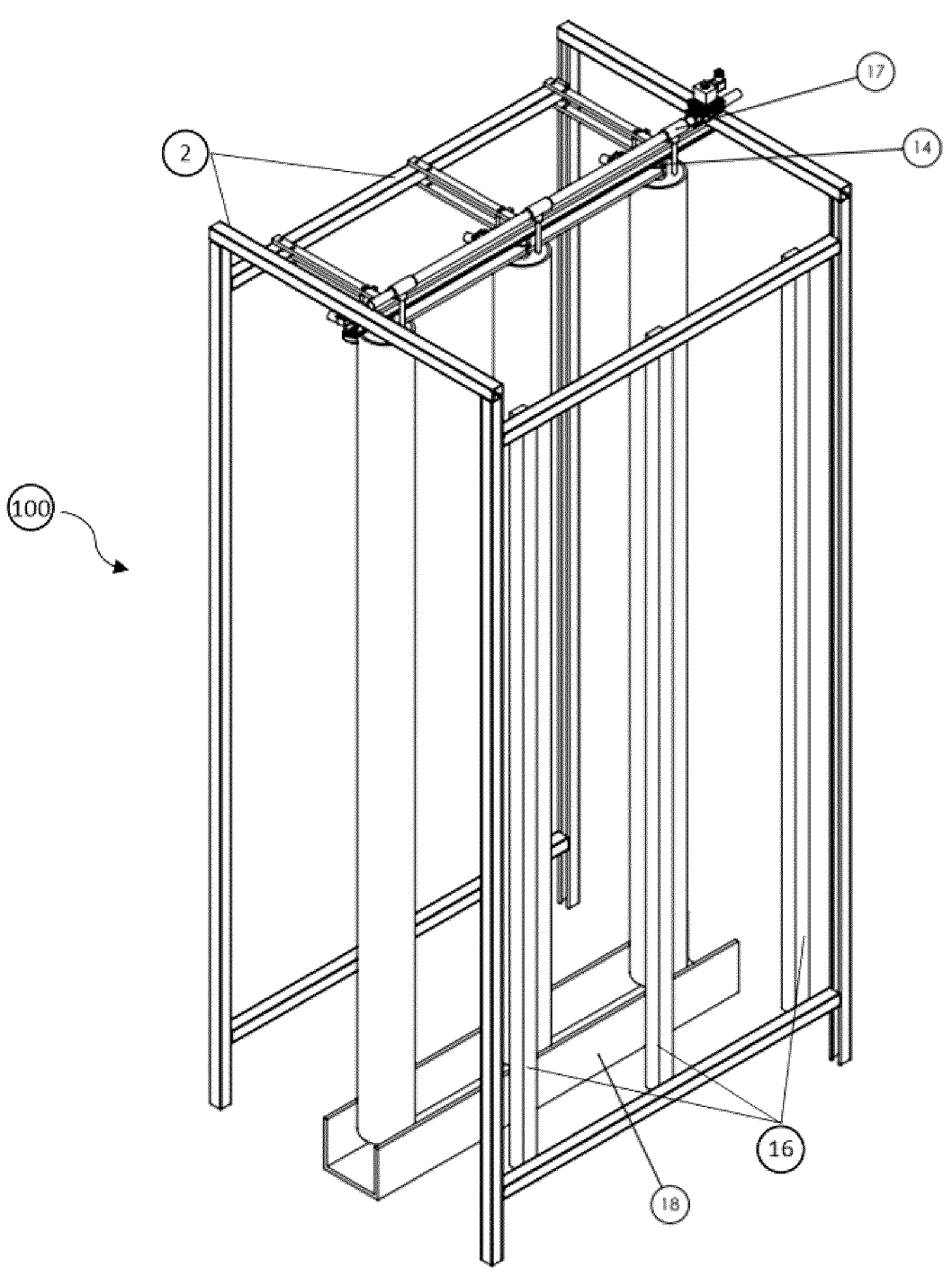
FIG. 2 depicts irrigation, drainage, and the connecting rods between horticulture towers for a system according to a non-limiting embodiment of the present disclosure.

Attention is directed to FIG. 1 and FIG. 2, which depict a system 100 for rotating multiple horticulture towers 3 according to non-limiting embodiments. When a horticulture tower 3 comes to a stop in its growing position, the horticulture tower 3 is placed in contact with the apparatus for rotating the horticulture tower 11. In the growing position, the horticulture tower 3 may be positioned in front of a light source 16, directly beneath irrigation 17, and directly above a water reclamation trough 18. The horticulture tower 3 may be rotated about its vertical axis in that position indefinitely by the apparatus for rotating the horticulture tower 11 until the tower is required to move to a different part of the farm for an agricultural process such as monitoring, harvesting, transplanting, or cleaning.

In some embodiments, such as the embodiment depicted in FIG. 1 and FIG. 2, each horticulture tower 3 is rotated by only one apparatus for rotating a horticulture tower 11. In some embodiments, each horticulture tower may be rotated by a plurality of apparatuses for rotating a horticulture tower. These apparatuses may be fixed at various positions along the vertical axis of the tower, such as top and bottom, to reduce swinging of the tower and increase surface contact to enable rotation.

In some embodiments, a horticulture tower may be supported from below during rotation. In other embodiments, a horticulture tower may be suspended from above during rotation. In some embodiments, a horticulture tower may be both supported from below and suspended from above during rotation. In some embodiments, the horticulture towers may be conveyed using a conveyor belt-like track which conveys the towers around a facility, and the base of the towers would rest upon a bearing allowing each tower to rotate freely about its vertical axis.

In another embodiment, the apparatus for rotating the horticulture tower could be applied on a circuitous carousel-like conveyance system which moves crops from a starting point (planting) to a finishing point (harvest) based on the time taken for such crops to mature.

A person skilled in the art may apply this system to any rotatable crop production vessel located on a conveyance system.

Figure 3:
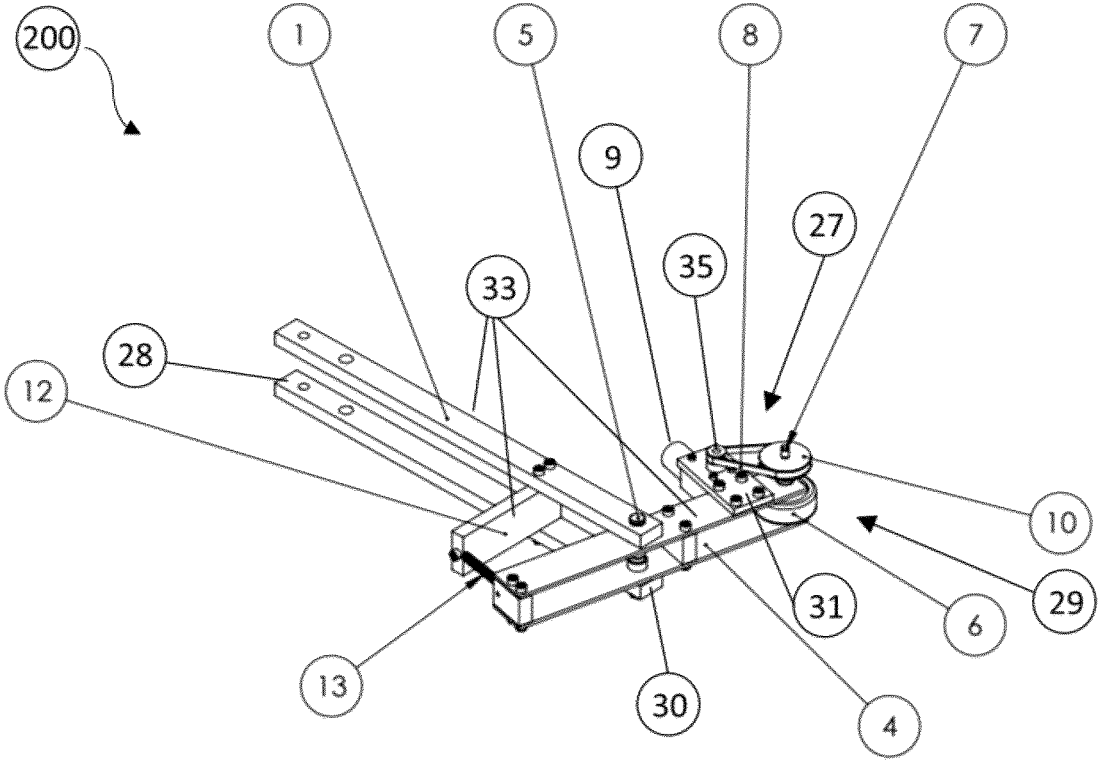
FIG. 3 depicts a top perspective view of an apparatus for rotating a horticulture tower according to a non-limiting embodiment of the present disclosure.
Figure 4:
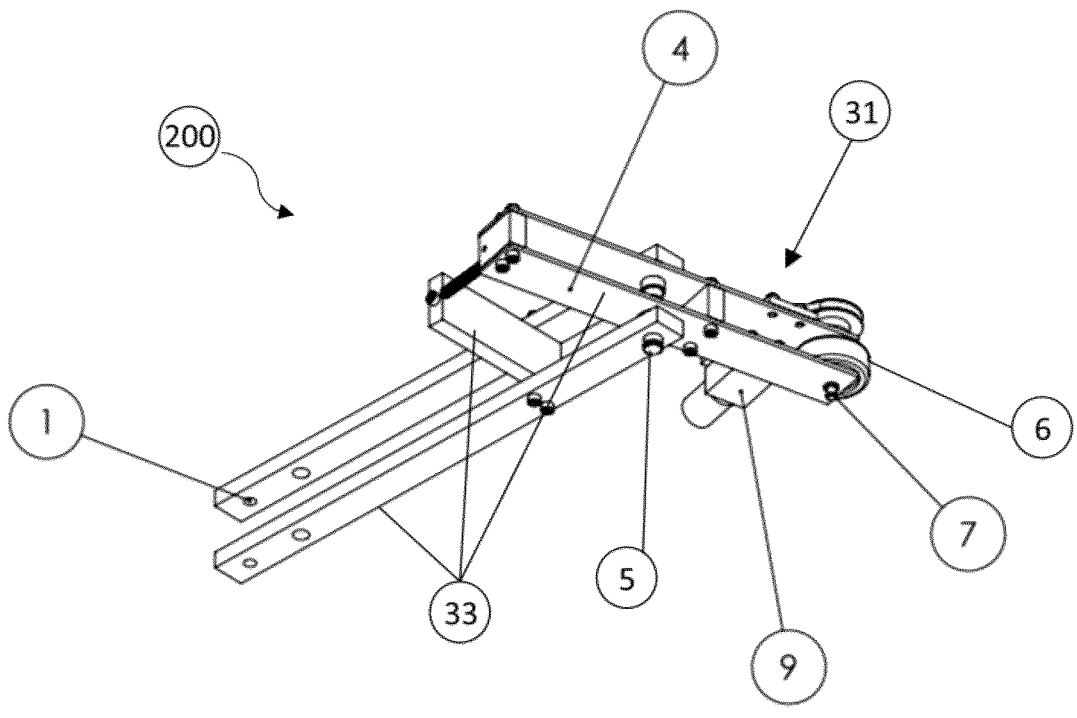
FIG. 4 depicts a bottom perspective view of an apparatus for rotating a horticulture tower according to a non-limiting embodiment of the present disclosure.
Figure 5:
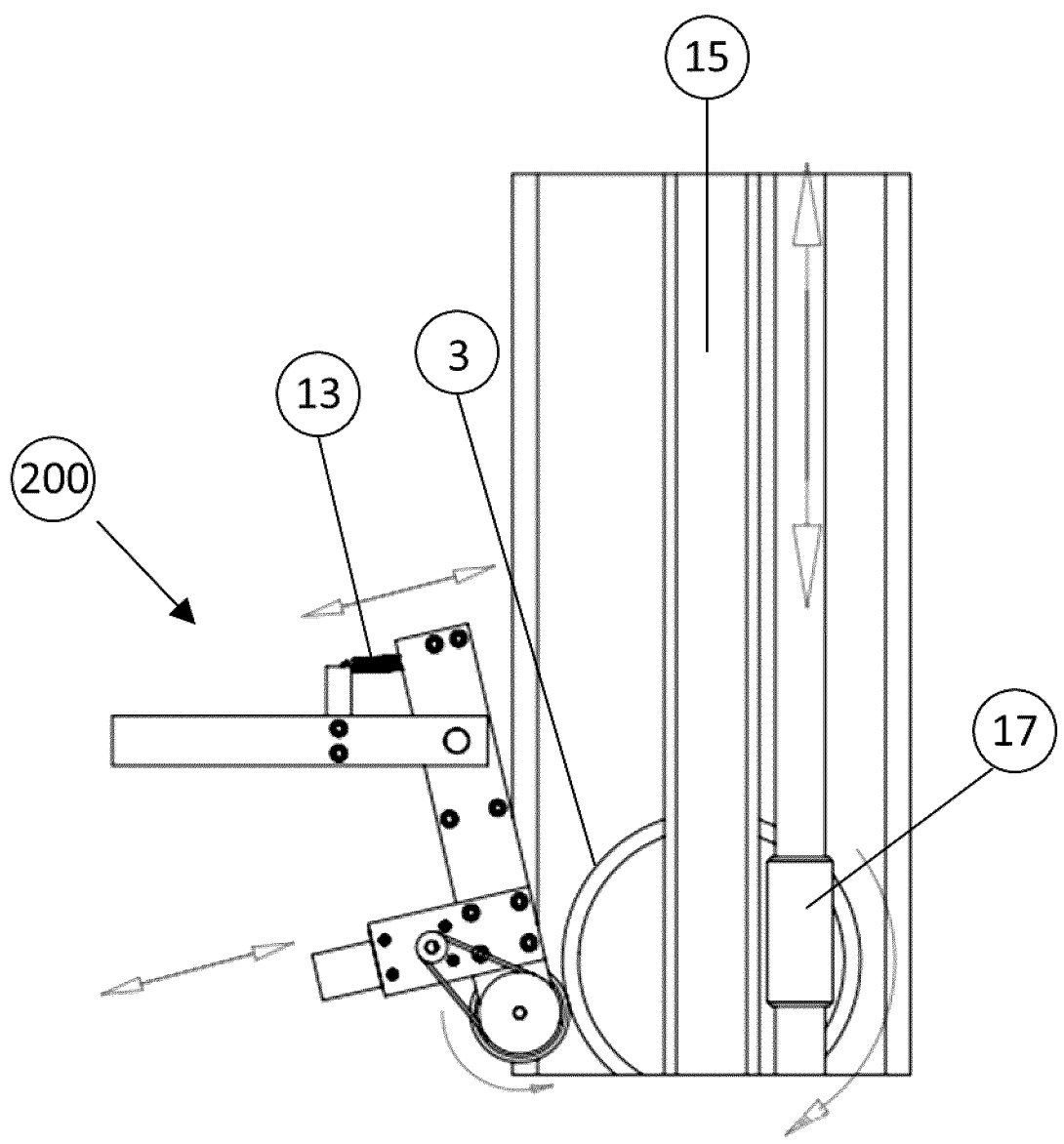
FIG. 5 depicts the various moving parts of an apparatus for rotating a horticulture tower, the axial rotation of a horticulture tower, and the movement of a horticulture tower by conveyance according to a non-limiting embodiment of the present disclosure.

Attention is directed to FIG. 3 and FIG. 4, which depicts an example apparatus 200 for rotating a horticulture tower 11, according to non-limiting embodiments. Apparatus 200 comprises drive motor 9, operatively connected to at least one power supply (not shown), a drive assembly 27, a wheel assembly 29 and an attachment assembly 31 for coupling the drive motor 9, drive assembly 27 and wheel assembly 29 to a support structure 33.

As noted above, the power supply is operatively connected to drive motor 9. According to some embodiments, drive motor 9 is a direct current (DC) motor. It is understood that any suitable power supply and drive motor is contemplated.

Drive assembly 27 is configured to impart (transfer) drive (torque) from drive motor 9 to wheel assembly 29 when drive motor 9 is engaged. Drive assembly 27 is operatively connected to an output shaft 35 of drive motor 9 and to an axle 7 of wheel assembly 29.

In the example configuration of FIG. 3, drive assembly 27 comprises pulley 10 coupled to the output shaft 35 of drive motor 9 via an endless drive member, such as belt 8. It is understood that any type of endless drive member suitable for transferring torque from the output shaft to pulley 10 is contemplated. For example, according to some embodiments, pulley 10 is replaced with a sprocket and the endless drive member comprises a chain configured to engage with teeth of the sprocket. Pulley 10 is operatively connected to axle 7 of wheel assembly 29 to drive rotation of axle 7, and tower engagement wheel 6 therewith.

Apparatus 200 also comprises an attachment assembly 31 for coupling the at least one drive motor 9, the at least one drive assembly 27 and the at least one wheel assembly 29 to a support structure 33. According to some embodiments, attachment assembly 31 comprises brackets and fasteners to couple the at least one drive motor 9, the at least one drive assembly 27 and the at least one wheel assembly 29 to the support structure 33. Fasteners comprise any suitable combination of fasteners, such as bolts, pins, screws, nuts, and the like. It is understood that any suitable brackets and fasteners, in any suitable configuration, is contemplated.

In the example configuration shown in FIG. 3, the support structure 33 comprises three arms. A first arm 1 has a first end 28 and a second end 30. The first arm 1 may be fixed at the first end 28 (see e.g., FIG. 1) and extends towards the horticulture tower 3 with the second end 30. A second arm 4 may be positioned almost perpendicular to the first arm 1.

The second arm 4 is connected to the second end 30, and is rotatable about an axle 5. A first end of the second arm is coupled with wheel assembly 29, including tower engagement wheel 6 that is mounted on axle 7. As noted above, pulley 10 is operatively connected to axle 7 to drive rotation of axle 7 and tower engagement wheel 6, which in turn drives the rotation of the tower. When a horticulture tower 3 is in position in front of apparatus 200, the tower engagement wheel 6 contacts the outside surface of the tower through frictional engagement and causes the horticulture tower to rotate about its vertical axis through the surface contact of the outer surface of the wheel 6 and the horticulture tower's exterior surface. The outer surface of the wheel 6 may be comprised of a material with a high coefficient of friction, such as rubber. When power is no longer supplied to motor 9, the tower engagement wheel 6 may freely spin, allowing the tower to pass by the apparatus 200 and be moved elsewhere.

In the embodiment shown in FIG. 3, the second arm 4 is attached on the second end to a third smaller arm 12 which may be perpendicular to the first arm 1 by a biasing mechanism 13. In this embodiment, the biasing mechanism 13 comprises at least one spring. It is understood that any suitable biasing mechanism is contemplated, such as an elastic. The spring biases the second end of the second arm 4 away from the tower, and in doing so, causes the tower engagement wheel 6 on the first end of the second arm to be positioned toward the horticulture tower's 3 exterior surface. When the horticulture tower 3 is in position, the biasing mechanism 13 tends to cause the tower engagement wheel 6 to remain in constant communication with the outside of the horticulture tower. The biasing mechanism 13 also provides some flexibility, so that the horticulture tower 3 may be easily moved away from the apparatus 200. It is understood that the spring may be mounted to any fixed point not located on the second arm. The horticulture tower's weight may cause it to remain in place even as the spring pushes the arm against the tower. The tower may be suspended from above on a swivel bearing 14 (see e.g., FIG. 1), which allows the tower to rotate on its vertical axis with ease. In this embodiment, the tower engagement wheel 6 contacts the outside of the tower at the top of the tower, such that the point of contact is nearest the suspension point of the tower, which ensures that the wheel remains in constant contact with the tower. The tower may be suspended or supported by a conveyor system 15 which enables the movement of the tower along a predetermined path or set of multiple paths around a facility.

According to some embodiments, a biasing mechanism which uses hydraulic, pneumatic, or motorized actuation instead of a spring(s) or elastic(s) is also contemplated.

According to some embodiments, more than one tower engagement wheel is coupled to the axle of the wheel assembly for rotation therewith.

According to some embodiments, tower engagement wheel 6 has an outer surface for frictional engagement with the horticulture towers. In some embodiments, tower engagement wheel 6 may comprise a sprocket or have a plurality of protruding members. The sprocket or plurality of protruding members may engage with corresponding teeth located along the surface of the horticulture tower.

In some embodiments, the drive assembly consists of the output shaft of the drive motor. In these embodiments, the axle of the wheel assembly is directly connected to the output shaft of the drive motor, such that the output shaft of the drive motor drives rotation of the axle of the wheel assembly.

Figure 6:
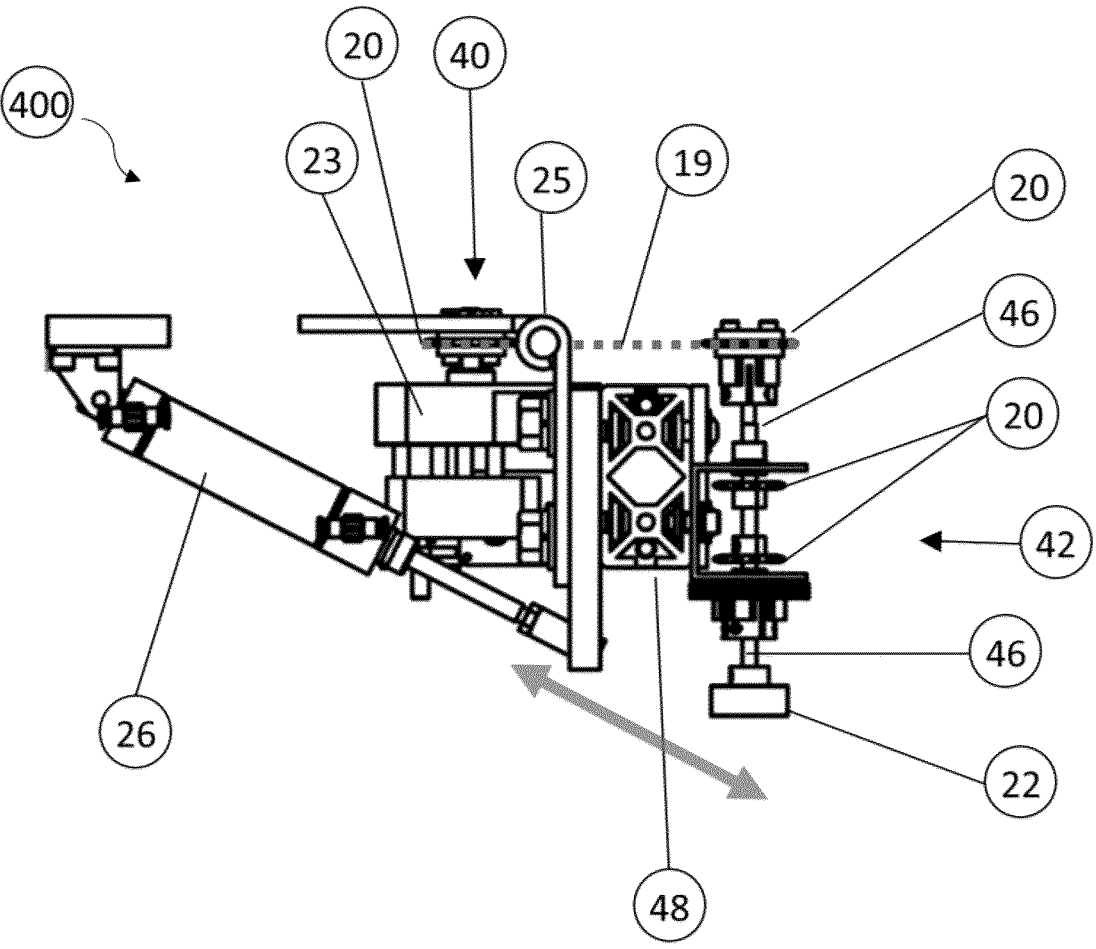
FIG. 6 depicts a biasing mechanism which uses pneumatic cylinders and a hinge to engage and disengage the apparatus from the horticulture towers according to a non-limiting embodiment of the present disclosure.
Figure 7:
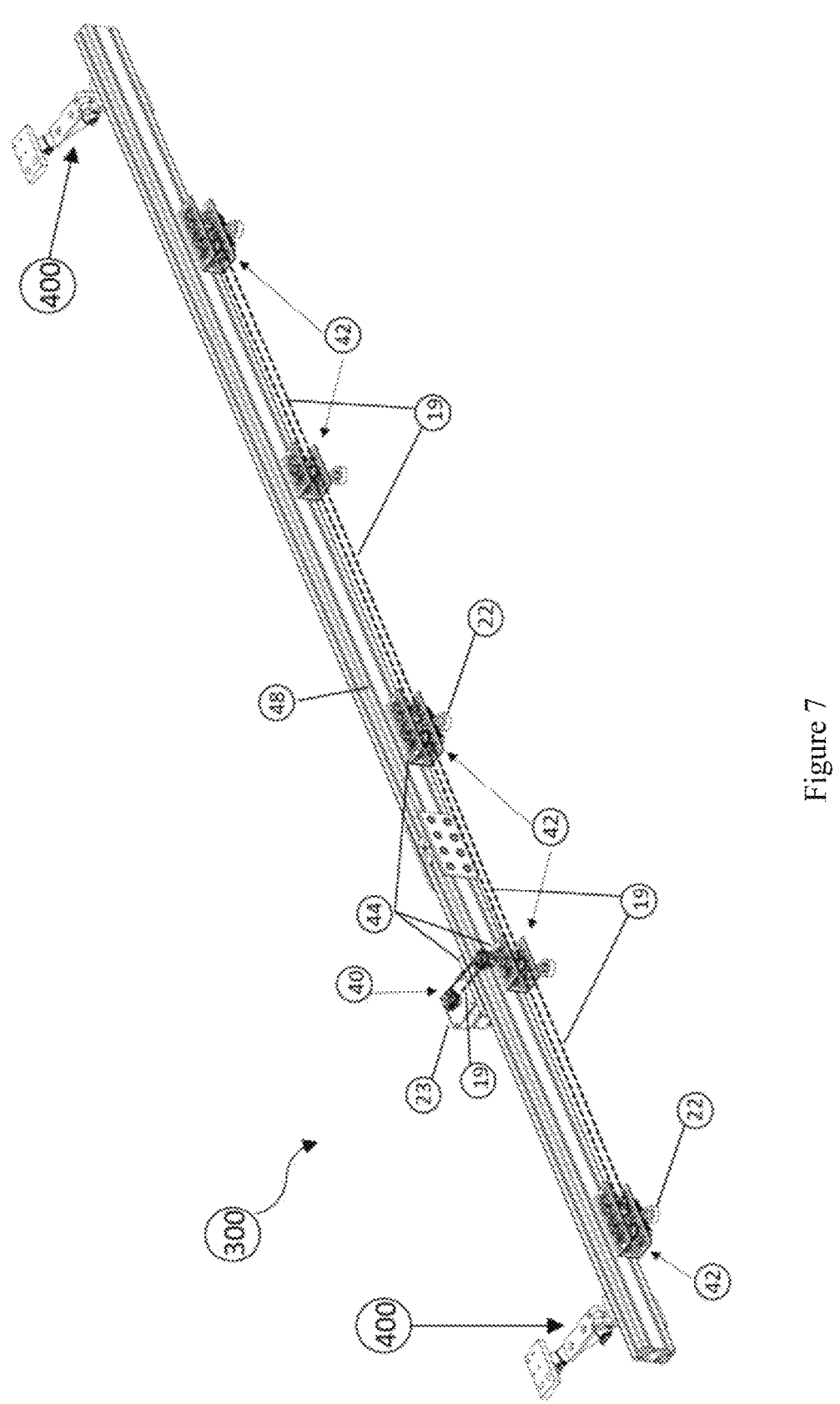
FIG. 7 depicts a top perspective view of an apparatus for rotating at least one horticulture tower according to a non-limiting embodiment of the present disclosure.
Figure 8:
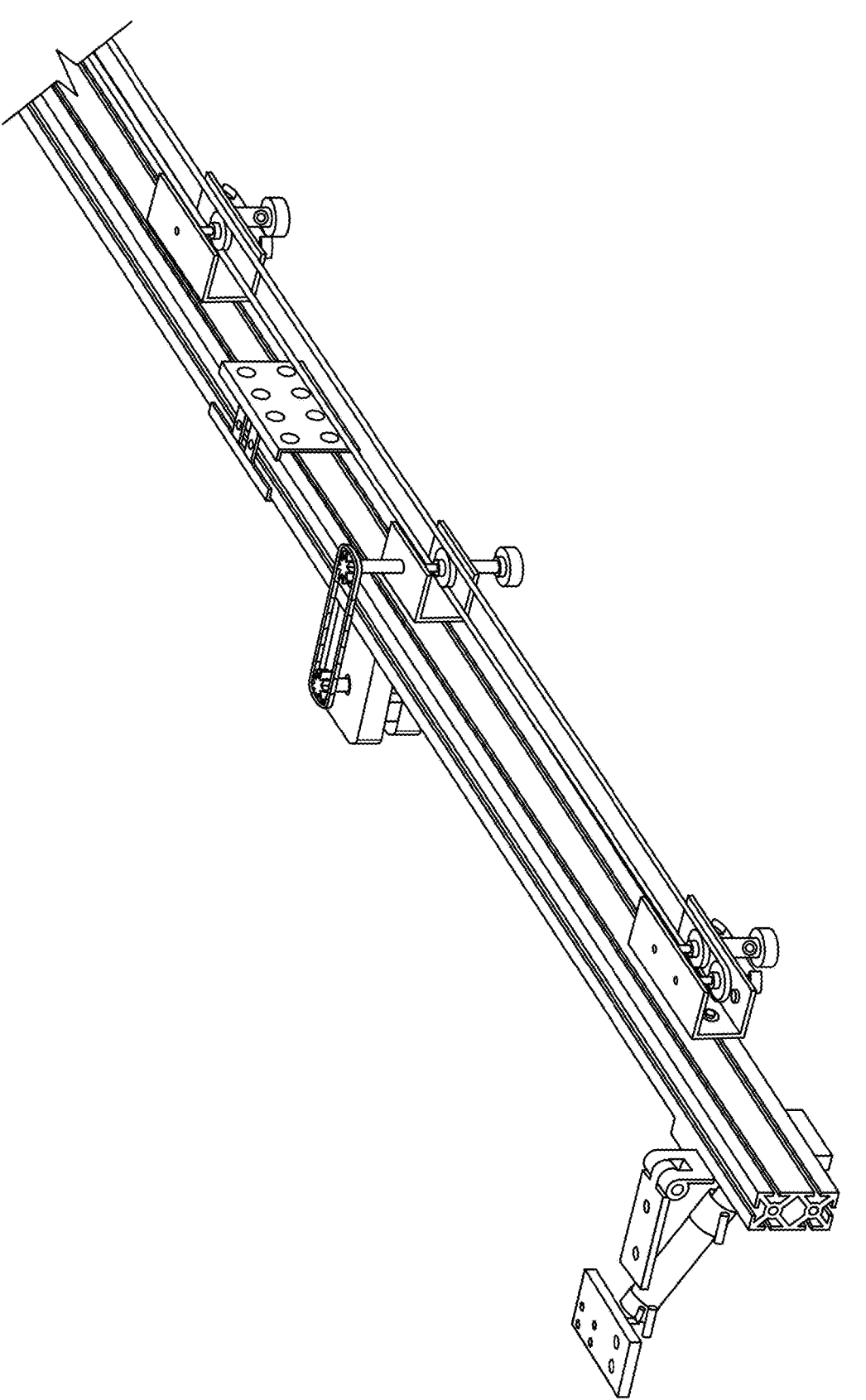
FIG. 8 depicts a top perspective view of a portion of the apparatus of FIG. 7, according to a non-limiting embodiment of the present disclosure.

Attention is directed to FIG. 6, FIG. 7 and FIG. 8, which depict an example apparatus 300 for rotating at least one horticulture tower, according to non-limiting embodiments. Apparatus 300 comprises at least one drive motor 23, operatively connected to at least one power supply (not shown), at least one drive assembly 40, at least one wheel assembly 42 and at least one attachment assembly 44 for coupling the at least one drive motor 23, at least one drive assembly 40 and at least one wheel assembly 42 to a support structure 48.

As noted above, the power supply is operatively connected to drive motor 23. According to some embodiments, drive motor 23 is a direct current (DC) motor. It is understood that any suitable power supply and drive motor is contemplated.

At least one drive assembly 40 is configured to impart (transfer) drive (torque) from drive motor 23 to at least one wheel assembly 29 when drive motor 23 is engaged. Each drive assembly 40 is operatively connected to an output shaft of drive motor 23 and to an axle 46 of wheel assembly 42.

In the example configuration of FIG. 6, FIG. 7 and FIG. 8, each drive assembly 40 comprises a first sprocket 20, the first sprocket 20 coupled to either the output shaft of drive motor 23 or a second sprocket 20 (that is operatively connected to drive motor 23) via an endless drive member, such as chain 19. It is understood that any type of endless drive member suitable for transferring torque from the output shaft or the second sprocket 20 to the first sprocket 20 is contemplated. For example, according to some embodiments, the first sprocket 20 is replaced with a pulley and the endless drive member comprises a belt configured to engage with the surface of the pulley. The first sprocket 20 is operatively connected to axle 46 of wheel assembly 42 to drive rotation of axle 46, and tower engagement wheel 22 therewith.

Apparatus 300 also comprises at least one attachment assembly 44 for coupling the at least one drive motor 23, the at least one drive assembly 40 and the at least one wheel assembly 42 to a support structure 48. According to some embodiments, attachment assembly 44 comprises brackets and fasteners to couple the at least one drive motor 23, the at least one drive assembly 40 and the at least one wheel assembly 42 to the support structure 48. Fasteners comprise any suitable combination of fasteners, such as bolts, pins, screws, nuts, and the like. It is understood that any suitable brackets and fasteners, in any suitable configuration, is contemplated.

In the exemplary configuration of FIG. 7 and FIG. 8, apparatus 300 comprises a support structure 48. Support structure 48 may comprise a rigid beam. At least two sprockets 20 are mounted to support structure 48, each sprocket 20 connected to the adjacent sprocket 20 by a chain 19. In some embodiments, sprockets 20 may be mounted equidistant from each other along support structure 48. Each sprocket 20 is operatively connected to an axle 46 of a wheel assembly 42 to drive rotation of axle 46, and at least one tower engagement wheel 22 therewith. In some embodiments, the outer surface of tower engagement wheel 22 comprises a material with a high coefficient of friction, such as rubber. At least one of the sprockets 20 is coupled with the output shaft of drive motor 23 by a chain, which in turn drives rotation of each of the sprockets 20 via the chains 19. In some embodiments, sprockets 20 and chains 19 may be mounted such that axle 46 of each adjacent wheel assembly rotates in opposite directions, thereby causing the tower engagement wheel(s) of each adjacent wheel assembly to rotate in opposite directions.

In the exemplary configuration of FIG. 6, FIG. 7, and FIG. 8, support structure 48 may be mounted to a fixed point via at least one biasing mechanism 400. The fixed point may be an overhead structure. Biasing mechanism 400 moveably connects the support structure to a fixed point, and is configured to bias the support structure towards the at least one horticulture tower. When actuated, the biasing mechanism 400 exerts a force on the support structure 48, thereby urging the support structure 48, at least one drive motor assembly 23, at least one drive assembly 40, at least one wheel assembly 42 and at least one attachment assembly 44 towards the at least one horticulture tower so that the apparatus may engage with the at least one horticulture tower. When deactivated, the biasing mechanism may retract the support structure 48, at least one drive motor assembly 23, at least one drive assembly 40, at least one wheel assembly 42 and at least one attachment assembly 44 away from the at least one horticulture tower, such that the at least one horticulture tower will be free to move along a conveyance track without interference from the rotational apparatus. When the at least one horticulture tower is in position in front of apparatus 300, and when the biasing mechanism is actuated, the outer surface of the at least one tower engagement wheel 22 operatively connected to and driven by the drive motor 23 will contact the exterior surface of the at least one tower through frictional engagement and will cause the horticulture tower(s) to rotate on its vertical axis through the surface contact of the outer surface of the wheel(s) and the horticulture tower(s)'s exterior surface.

In some embodiments, such as the example configuration shown in FIG. 6, the biasing mechanism 400 may include at least one hinge 25 and at least one pneumatic actuator, such as pneumatic cylinder 26. Hinge 25 may comprise a first hinge portion connected to the fixed point, and a second hinge portion connected to the support structure 48. The first hinge portion may be pivotally coupled to the second hinge portion. The pneumatic cylinder 26 is operatively connected to the first and second hinge portions. When the pneumatic cylinder 26 is actuated, the pneumatic cylinder 26 exerts a force on the second hinge portion urging the support structure 48 towards the at least one horticulture tower thereby allowing the at least one tower engagement wheels to engage with the at least one horticulture tower. When the pneumatic cylinder 26 is deactivated, the pneumatic cylinder 26 exerts an opposing force on the second hinge portion, thereby retracting the support structure 48 away from the at least one horticulture tower. It is understood that other suitable actuating mechanisms besides a pneumatic cylinder are contemplated, such as hydraulic cylinders or electrical motors.

It is understood that other suitable biasing mechanisms to move the apparatus 300 towards and away from the horticulture towers are contemplated.

In other exemplary embodiments, the biasing mechanism may use a track and slide mechanism instead of a hinge to linearly bias the support structure, at least one drive motor assembly, at least one drive assembly, at least one wheel assembly, and at least one attachment assembly towards the at least one horticulture tower. The linear bias along a track and slide may be actuated with pneumatic cylinders, hydraulic cylinders, electrical motors, or another method of actuation, such that the biasing mechanism may move the apparatus 300 towards and away from the horticulture towers.

In other exemplary embodiments, the apparatus may comprise two or more tower engagement wheels to help increase contact with the surface of the horticulture tower.

In another exemplary embodiment, the apparatus contacts the interior surface of the tower instead of the exterior surface of the tower to further avoid contact with plant growth. In yet another embodiment, the apparatus pinches the interior and exterior surfaces of the tower simultaneously.

In yet other exemplary embodiments, the apparatus or components of the apparatus may be manually or automatically retracted when towers are in motion on the conveyance system. Similarly, the apparatus or components of the apparatus may be deployed towards a horticulture tower when the tower comes to rest in position in front of the apparatus.

In some exemplary embodiments, the apparatus is used to rotate towers for data collection of multiple points on the outside of the tower. These data may include leaf temperature, photographic data, or other data which can be more easily collected from a single sensor when the tower is rotating. The apparatus may also be used during a tower cleaning process or a harvesting process.

In another embodiment, the apparatus may comprise multiple arms with multiple wheels which engage with the surface of the tower at multiple points along its outer circumference to hold it firmly in place and prevent swinging of the tower. In this embodiment, the multiple arms could be activated either by an operator or automatically when a sensor senses the presence of a tower in a growing position. Then using actuation, the multiple arms would press the wheels against multiple points along the surface of the tower. Any number of the contacting wheels may be powered, with the other wheels able to rotate freely and acting only as a clamp to prevent the tower from swinging as it rotates in place.

It will be appreciated that for simplicity and clarity of illustration, where considered appropriate, reference numerals may be repeated among the figures to indicate corresponding or analogous elements. In addition, numerous specific details are set forth in order to provide a thorough understanding of the exemplary aspects of the present application described herein. However, it will be understood by those of ordinary skill in the art that the exemplary aspects described herein may be practiced without these specific details. In other instances, well-known methods, procedures and components have not been described in detail so as not to obscure the exemplary aspects described herein. Also, the description is not to be considered as limiting the scope of the exemplary aspects described herein. Any systems, method steps, method blocks, components, parts of components, and the like described herein in the singular are to be interpreted as also including a description of such systems, method steps or tasks, components, parts of components, and the like in the plural, and vice versa.

Persons of skill will appreciate that there are yet more alternative implementations and modifications possible, and that the above examples are only illustrations of one or more implementations. The scope, therefore, is only to be limited by the claims appended hereto.

Interpretation

It will also be understood that for the purposes of this application, "at least one of X, Y, and Z" or "one or more of X, Y, and Z" language can be construed as X only, Y only, Z only, or any combination of two or more items X, Y, and Z (e.g., XYZ, XYY, YZ, ZZ).

In the present application, components may be described as being "configured to" or "enabled to" perform one or more functions. Generally, it is understood that a component that is configured to or enabled to perform a function is configured to or enabled to perform the function, or is suitable for performing the function, or is adapted to perform the function, or is operable to perform the function, or is otherwise capable of performing the function.

Additionally, components in the present application may be described as being "operatively connected to", "operatively coupled to", and the like, to other components. It is understood that such components are connected or coupled to each other in a manner to perform a certain function. It is also understood that "connections", "coupling" and the like, as recited in the present application include direct and indirect connections between components.

References in the application to "one embodiment", "an embodiment", "an implementation", "a variant", etc., indicate that the embodiment, implementation or variant described may include a particular aspect, feature, structure, or characteristic, but not every embodiment, implementation or variant necessarily includes that aspect, feature, structure, or characteristic. Moreover, such phrases may, but do not necessarily, refer to the same embodiment referred to in other portions of the specification. Further, when a particular aspect, feature, structure, or characteristic is described in connection with an embodiment, it is within the knowledge of one skilled in the art to affect or connect such module, aspect, feature, structure, or characteristic with other embodiments, whether or not explicitly described. In other words, any module, element or feature may be combined with any other element or feature in different embodiments, unless there is an obvious or inherent incompatibility, or it is specifically excluded.

It is further noted that the claims may be drafted to exclude any optional element. As such, this statement is intended to serve as antecedent basis for the use of exclusive terminology, such as "solely", "only", and the like, in connection with the recitation of claim elements or use of a "negative" limitation. The terms "preferably", "preferred", "prefer", "optionally", "may", and similar terms are used to indicate that an item, condition or step being referred to is an optional (not required) feature of the invention.

The singular forms "a", "an", and "the" include the plural reference unless the context clearly dictates otherwise. The term "and/or" means any one of the items, any combination of the items, or all of the items with which this term is associated. The phrase "one or more" is readily understood by one of skill in the art, particularly when read in context of its usage.

As will be understood by a person of skill, for any and all purposes, particularly in terms of providing a written description, all ranges recited herein also encompass any and all possible sub-ranges and combinations of sub-ranges thereof, as well as the individual values making up the range, particularly integer values. A recited range includes each specific value, integer, decimal, or identity within the range. Any listed range can be easily recognized as sufficiently describing and enabling the same range being broken down into at least equal halves, thirds, quarters, fifths, or tenths. As a non-limiting example, each range discussed herein can be readily broken down into a lower third, middle third and upper third, etc.

What is claimed is:

1. A system for rotating at least one horticulture tower, the system comprising:
at least one horticulture tower movable along a track; and

an apparatus for individually rotating each horticulture tower of the at least one horticulture tower;
wherein the apparatus is stationary along the track and each horticulture tower is moveable along the track to an apparatus engagement position in which the apparatus is engageable with an individual horticulture tower of the at least one horticulture tower;
the apparatus comprises a drivable tower engagement wheel mounted on a first hinge portion of a pneumatic actuated hinge, wherein the first hinge portion of the pneumatic actuated hinge is moveable from a first position in which the drivable tower engagement wheel is disengaged from the horticultural tower in the apparatus engagement position to allow movement of the that horticulture tower along the track to a second position in which the drivable tower engagement wheel is engaged with the horticultural tower in the apparatus engagement position for rotation of that horticultural tower.

2. The system of claim 1, wherein the track is a conveyor system and the at least one horticulture tower is suspended or supported by the conveyor system.

3. The system of claim 1, wherein the system comprises a plurality of apparatuses for individually rotating each horticultural tower of the at least one horticulture tower.

4. The system of claim 1, wherein the system further comprises a light source, an irrigation source, a ventilation source or a combination thereof.

5. An apparatus for rotating at least one horticulture tower that is moveable along a track, the apparatus comprising:
at least one drive motor, the at least one drive motor operatively connected to
at least one power supply;
at least one drive assembly for imparting drive from the at least one drive motor to at least one wheel assembly, the at least one drive assembly being operatively connected to an output shaft of the at least one drive motor and an axle of the at least one wheel assembly, the at least one wheel assembly having at least one tower engagement wheel coupled to the axle for rotation therewith, the at least one tower engagement wheel having an outer surface for frictional engagement with the at least one horticulture tower; and
an attachment assembly for coupling the at least one drive motor, the at least one drive assembly and the at least one wheel assembly to a support structure; wherein the support structure comprises
a first arm having a first end and a second end;
a second arm having a first end and a second end, the second arm being rotatably connected to the second end of the first arm; and
a biasing mechanism moveably connecting the second arm to a fixed point, the biasing mechanism configured to bias the second end of the second arm toward the first arm;
wherein the at least one wheel assembly is connected to the first end of the second arm
wherein the at least one tower engagement wheel when driven by the at least one drive motor and frictionally engaged to said at least one horticulture tower causes the at least one horticulture tower to rotate; and
wherein said apparatus is stationary along the track.

6. The apparatus of claim 5, wherein the fixed point is the first arm.

7. The apparatus of claim 5, wherein the biasing mechanism moveably connects the second end of the second arm to the fixed point, thereby pulling the second end of the second arm towards the fixed point.

8. The apparatus of claim 5, wherein the biasing mechanism moveably connects the first end of the second arm to the fixed point, thereby pushing the first end of the second arm away from the fixed point.

9. The apparatus of claim 5, wherein the biasing mechanism comprises at least one spring.

10. The apparatus of claim 5, further comprising a third arm having a first end and a second end, the first end of the third arm being connected to the first arm; and wherein the biasing mechanism moveably connects the second end of the second arm to the third arm, the biasing mechanism configured to bias the second end of the second arm toward the third arm.

11. The apparatus of claim 5, further comprising a third arm having a first end and a second end, the first end of the third arm being connected to the first arm; and wherein the biasing mechanism moveably connects the first end of the second arm to the third arm, the biasing mechanism configured to bias the first end of the second arm away from the third arm.

12. The apparatus of claim 5, wherein the outer surface of the at least one tower engagement wheel comprises rubber.

13. The apparatus of claim 5, wherein the outer surface of the at least one tower engagement wheel comprises a sprocket or a plurality of protruding members.

14. The apparatus of claim 5, wherein the apparatus comprises a plurality of drive assemblies and a plurality of wheel assemblies; and wherein at least one drive assembly is coupled to the axles of two of the wheel assemblies.

15. An apparatus for rotating at least one horticulture tower that is moveable along a track, the apparatus comprising:

at least one drive motor, the at least one drive motor operatively connected to at least one power supply;

at least one drive assembly for imparting drive from the at least one drive motor to at least one wheel assembly, the at least one drive assembly being operatively connected to an output shaft of the at least one drive motor and an axle of the at least one wheel assembly, the at least one wheel assembly having at least one tower engagement wheel coupled to the axle for rotation therewith, the at least one tower engagement wheel having an outer surface for frictional engagement with the at least one horticulture tower;

an attachment assembly for coupling the at least one drive motor, the at least one drive assembly and the at least one wheel assembly to a support structure; and at least one biasing mechanism, each biasing mechanism moveably connecting the support structure to a fixed point, the at least one biasing mechanism configured to bias the support structure towards the at least one horticulture tower; wherein the at least one biasing mechanism comprises a hinge having a first hinge portion connected to the fixed point; and a second hinge portion connected to the support structure and pivotally coupled to the first hinge portion;

a pneumatic actuator operatively connected to the first and second hinge portions, wherein, upon being actuated, the pneumatic actuator exerts a force on the second hinge portion urging the support structure towards the at least one horticulture tower wherein the at least one tower engagement wheel when driven by the at least one drive motor and frictionally engaged to said at least one horticulture tower causes the at least one horticulture tower to rotate; and wherein said apparatus is stationary along the track.

16. The apparatus of claim 15, wherein the outer surface of the at least one tower engagement wheel comprises rubber.

17. The apparatus of claim 15, wherein the outer surface of the at least one tower engagement wheel comprises a sprocket or a plurality of protruding members.

18. The apparatus of claim 15, wherein the apparatus comprises a plurality of drive assemblies and a plurality of wheel assemblies; and wherein at least one drive assembly is coupled to the axles of two of the wheel assemblies.

\* \* \* \* \*